3,077,480
UNSYMMETRICAL ACETALS CONTAINING THE 3,4-METHYLENEDIOXYPHENYL GROUP AND METHOD OF MAKING AND STABILIZING SAME
Oscar F. Hedenburg, Pittsburgh, Pa., assignor to Rex Research Corporation, Toledo, Ohio, a corporation of Delaware
No Drawing. Filed July 20, 1960, Ser. No. 44,011
9 Claims. (Cl. 260—340.5)

This invention relates to new chemical compounds especially valuable for use in insecticidal compositions as synergists for the insecticidal effectiveness of pyrethrins and allethrin and other insecticidally active compounds closely related to pyrethrins and allethrin, for instance, cyclethrin and furethrin. The invention includes the new compounds, per se, and an effective method for producing them and also includes insecticidal compositions containing pyrethrins, allethrin or the like synergized by one or more of the compounds of this invention.

The new compounds of my present invention may be generally characterized structurally as being composed of an alcohol radical containing a methylenedioxyphenyl group connected to the radical of an alcohol of the formula R—[—O—$(CH_2)_m$]$_n$—OH through a formal linkage, R representing alkyl of 1 to 4 carbon atoms, $m$ being an integer 2 or 3 and $n$ being an integer 1 or 2.

The first-mentioned alcohol may, for instance, be piperonyl alcohol. However, especially effective synergists have been obtained where the first-mentioned alcohol is one produced by reacting mercaptoethanol with safrole or with isosafrole so that the thioethanol group is added to the double bond of the allyl side chain of the safrole or the propenyl side chain of the isosafrole, yielding compounds of the formula:

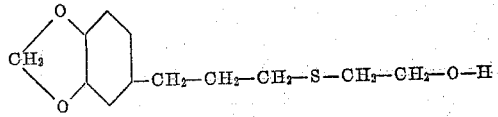

or

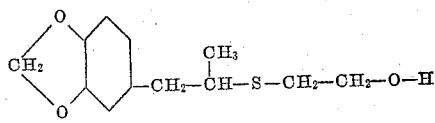

These thio alcohols may, with advantage, be produced by heating a mixture of 1 mole (162 grams) of safrole or isosafrole and an excess of mercaptoethanol, e.g., about 100 grams or 1.25+ moles, at a temperature of about 130° C. for a period of several days, e.g., 4 or 5 days. Excess mercaptoethanol is removed by continued heating at reduced pressure. Upon cooling, a nonreactive volatile solvent, such as benzene, is added and any remaining unreacted mercaptoethanol is washed from the benzene solution with an aqueous solution of 5 grams of sodium hydroxide, followed by several extractions with water to neutral reaction. The benzene is then removed by distillation at reduced pressure yielding the theoretical 240 grams ±8 grams of the product.

The above-described reaction temperature does not appear to be particularly critical, the reaction proceding at temperatures somewhat higher or somewhat lower than 130° C. the time and temperature factors appearing to be interdependent, e.g., at lower temperature, a longer heating period will usually be required to complete the reaction.

The monoalkyl glycols and the monoalkyl polyglycols used in accordance with my present invention may, as previously indicated, be represented by the formula

R, $m$ and $n$ having the previously defined significance. As this reactant, I have used, with particular advantage, butoxyethoxyethyl alcohol, ethoxyethoxyethyl alcohol, methoxyethoxyethyl alcohol or butoxyethyl alcohol. However, any of the other alcohols represented by the formula may be advantageously used.

In accordance with the process of my present invention, my new compounds are produced by reaction at an elevated temperature of the two alcohol constituents previously described and formaldehyde, or other aldehyde, in the presence of a strong, nonvolatile acid catalyst, for instance toluenesulfonic acid. Water formed by this reaction must be eliminated in order to carry the reaction to satisfactory completion. This may be effected by heating the mixture in an inert volatile solvent, advantageously benzene, with refluxing over a water trap to eliminate the water by azeotropic distillation. However, the presence of the solvent is not essential, as it does not enter into the reaction, and in many instances it has been found preferable to remove the water by reduced pressure distillation. Preferably, when the so-called solvent is used, the aldehyde is substantially completely dissolved in the mixture of reactants prior to introducing the solvent.

If the alcohol containing the methylenedioxyphenyl radical be represented by R' and the monoalkyl glycol or polyglycol is represented by R'', and the aldehyde is formaldehyde, the resultant compounds may be represented by the formula R'—O—$CH_2$—O—R'' which will be recognized as an unsymmetrical formal. It is these unsymmetrical formals which constitute the novel chemical compounds of my present invention.

Other possible reaction products are the two symmetrical formals represented by the formulae

and 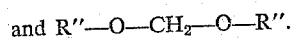

It is apparent that the reaction resulting in the unsymmetrical formal requires equal molar proportions of each of the reactant alcohols and of formaldehyde.

I have found that where equimolar proportions of these dissimilar alcohols are reacted with an equivalent amount of formaldehyde, or other aldehyde, in the presence of a small amount of a strong, nonvolatile acid catalyst, of the type herein described, and the mixture refluxed with benzene over a water trap, the unsymmetrical formal is formed.

I have found these unsymmetrical formals, so produced, to be highly effective synergists for pyrethrins and allethrin and the like, as previously noted. However, I have also found that, unless special precaution is taken, the two symmetrical formals will also be formed and that the unsymmetrical formal, upon standing, will lose some of its synergistic effectiveness and become less soluble in mineral oils of the type normally used as the vehicle in liquid insecticidal compositions. I have further found that this decrease in effectiveness and solubility is due to disproportionation of the highly effective unsymmetrical formal whereby it is in part converted to the two symmetrical formals of the respective alcohols.

For example, where the dissimilar alcohols are isosafrole thioethyl alcohol and butoxyethoxyethyl alcohol the respective formals present in the mixture, as produced or after disproportionation has occurred, may be represented by the following formulae:

I
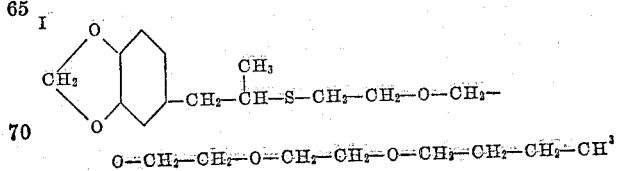

II

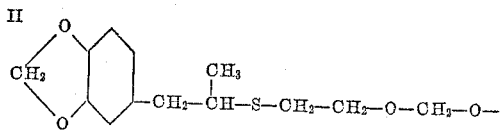

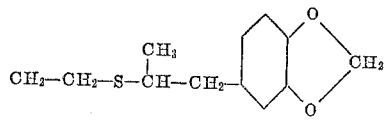

III $CH_3-CH_2-CH_2-CH_2-O-CH_2-CH_2-O-CH_2-CH_2-O-$
$CH_2-O-CH_2-CH_2-O-CH_2-CH_2-O-CH_2-CH_2-CH_2-CH$

The resultant mixture of these three formals, as just noted, has been found to be only partially soluble in the mineral oil vehicle and further is only partially soluble in pyrethrum extract No. 20. It presently appears that the insoluble material is that represented by the foregoing Formula II.

In my effort to avoid the production of such objectionable material and to stabilize my novel synergists against deterioration on standing, I have discovered that this may be readily accomplished by using in the reaction mixture, just described, a substantial excess of the monoalkyl glycol, or polyglycol, reactant, e.g., butoxyethoxyethyl alcohol, and increasing the proportion of formaldehyde used by an amount equivalent to the excess of butoxyethoxyethyl alcohol. More advantageously, the amount of the butoxyethoxyethyl alcohol used should be about twice that theoretically required to produce the unsymmetrical formal.

While in the foregoing discussion, I have referred particularly to butoxyethoxyethyl alcohol, it will be understood that what is there disclosed is equally applicable to reactions in which other monoalkyl polyglycols or monoalkyl glycols are used, and products made in accordance therewith have been found to be completely soluble in pyrethrum extract No. 20 and to possess markedly improved insecticidal properties.

The excess of the monoalkyl glycol, or polyglycol, constituent, together with the equivalent excess of formaldehyde, serves to repress the formation of the symmetrical formal represented by Formula II and the unsymmetrical formal represented by Formula I is thereby stabilized against disproportionation so that the resultant product consists essentially of the unsymmetrical formal represented by Formula I together with a smaller, but presently undetermined, amount of the formal represented by Formula III but contains little or none of the symmetrical formal represented by Formula II.

As previously noted, I have, with particular advantage, carried out the reaction in the presence of toluenesulfonic acid. However, other strong nonvolatile acids may be used for this purpose, for instance naphthalenesulfonic acid, or benzenesulfonic acid. The proportion of the acid catalyst is subject to some variation. However, I have, with particular advantage, used approximately 0.5 to 2 grams of the acid per gram mole of the methylenedioxyphenyl alcohol constituent. The acid catalyst serves to promote depolymerization of the paraformaldehyde and the synthesis of the unsymmetrical formal.

Also, in place of formaldehyde, I may use other aldehydes, for instance, I may use an equivalent proportion of butyraldehyde. Where formaldehyde is used, I prefer to supply it to the reaction mixture in the form of paraformaldehyde. In the following examples, I have used paraformaldehyde U.S.P.X. as the source of formaldehyde.

The invention will be further described and illustrated by the following specific examples:

*Example I*

This example, in which equal molar proportions of the respective alcohols and an equivalent amount of paraformaldehyde were used, is given as illustrative of the broader aspect of the invention. In this operation, there was used 60 grams (0.25 mole) of isosafrole thioethyl alcohol, 40.5 grams (0.25 mole) of n-butoxyethoxyethyl alcohol and 9 grams of paraformaldehyde. These materials were mixed and heated in 75 cc. of benzene containing 0.2 gram of toluenesulfonic acid and the mixture refluxed for one hour, using a water trap, until no more water was collected in the trap.

In this, and other operations described herein, a slight excess of paraformaldehyde was used for the reason that some formaldehyde is carried off with the water during the refluxing.

The remaining product in benzene solution was then washed with an aqueous solution of sodium sulfite to neutralize the acid and thereafter the benzene was distilled off at reduced pressure. The crude product was found to weigh 102 grams and to be soluble in 200 cc. of normal heptane. The heptane solution was filtered and distilled off at reduced pressure, leaving 100 grams of the product, equivalent to 96.6% of the calculated yield.

When tested against houseflies by the Peet-Grady method at a concentration of 300 milligrams of the product just described and 30 milligrams of pyrethrins in 100 cc. of odorless base oil, there was obtained a knockdown of 91.9% and a kill of 81%, as compared with the OTI knockdown of 92.1% and a kill of 53.2%. At a concentration of 500 milligrams of the product and 30 milligrams of pyrethrins in 100 cc. of the base oil, similarly tested, there was obtained a knockdown of 93.9% and a kill of 86%.

*Example II*

In this operation, the proportion of butoxyethoxyethyl alcohol was double that used in the preceding example and the amount of formaldehyde used was increased by the equivalent of the excess butoxyethoxyethyl alcohol. The respective constituents and proportions thereof were accordingly as follows:

Isosafrole thioethyl alcohol____ 60 grams (0.25 mole).
Butoxyethoxyethyl alcohol_____ 81 grams (0.5 mole).
Paraformaldehyde_____ 13 grams.
Toluenesulfonic acid_____ 0.2 gram.

These materials were mixed and heated in 70 cc. of benzene with refluxing over a water trap until no more water was evolved. Then 2 grams of paraformaldehyde was added and the mixture again subjected to refluxing to remove water. The acid present in the mixture was then neutralized, as in the preceding example, the mixture permitted to stand overnight and was then filtered to remove precipitated salt. The benzene was then distilled off at reduced pressure, leaving a product weighing 142.5 grams, equivalent to 97.9% of the calculated 145.5 grams, of which about 42 grams was the symmetrical formal of Formula III.

When tested against houseflies by the Peet-Grady method at a concentration of 300 milligrams of the product and 30 milligrams of pyrethrins in 100 cc. of odorless base oil, there was obtained a knockdown of 92.4% and a kill of 87.5% as compared with an OTI knockdown of 93.4% and a kill of 54.3%. At a concentration of 430 milligrams of the product and 30 milligrams of pyrethrins in 100 cc. of odorless base oil, there was obtained a knockdown of 93.3% and a kill of 89.6%.

The values just given show a superiority of the product of Example II over that of Example I. In an additional test by the Peet-Grady method against houseflies using a concentration of 300 milligrams of the product of Example II and 30 milligrams of pyrethrins in 100 cc. of odorless base oil, a knockdown of 97% and a kill of 96% were obtained. At a concentration of 200 milligrams of the product of Example II and 25 milligrams of pyrethrins per 100 cc. of the base oil, a knockdown of 92% and a kill of 81% were obtained, as compared with the OTI knockdown of 96% and a kill of 46%.

In a like test, using a concentration of 500 milligrams of the product of Example II and 50 milligrams of allethrin in 100 cc. of base oil, there was obtained a knockdown of 90% and a kill of 75%. In a further test at a concentration of 500 milligrams of this product and 50 milligrams of allethrin per 100 cc. of base oil, a knockdown of 93% and a kill of 87% were obtained, as compared with the OTI knockdown of 96% and kill of 53%.

*Example III*

In this operation, the following materials and proportions thereof were used:

Isosafrole thioethyl alcohol _____ 60 grams (0.25 mole).
Ethoxyethoxyethyl alcohol _____ 67 grams (0.5 mole).
Paraformaldehyde _____ 16 grams.
Toluenesulfonic acid _____ 0.2 gram.

These materials were mixed and heated to about 85° C. until most of the paraformaldehyde had dissolved. 70 cc. of benzene was then added to the mixture and the mixture heated with refluxing over a water trap for 4½ hours for removal of the water from the reaction mixture. The benzene solution was then washed, as previously described, for removal of acid and the benzene distilled off at reduced pressure, leaving 126 grams of product, equivalent to 95.8% of the calculated 131.5 gram yield. The synergistic value of this product was substantially the same as that of the preceding example.

*Example IV*

In this operation, the following materials and proportions thereof were used:

Isosafrole thioethyl alcohol _____ 60 grams (0.25 mole).
Methoxyethoxyethyl alcohol ____ 60 grams (0.5 mole).
Paraformaldehyde _____ 16 grams.
Toluenesulfonic acid _____ 0.2 gram.

These materials were mixed and heated at about 85° C. until most of the paraformaldehyde has dissolved and thereafter 70 cc. of benzene was added to the mixture and the mixture heated with refluxing over a water trap for 2½ hours. The benzene solution was then washed to neutralize the acid as previously described and the benzene was distilled off at reduced pressure yielding 122 grams of product, equivalent to 98% of the calculated 124.5 gram yield.

When tested by the Peet-Grady method against houseflies at a concentration of 400 milligrams of the product of the foregoing example and 30 milligrams of pyrethrins in 100 cc. of odorless base oil, a knockdown of 88.6% and a kill of 83.9% were obtained, as compared with an OTI knockdown of 94.2% and a kill of 54.5%.

*Example V*

In this operation, the following materials and proportions thereof were used:

Isosafrole thioethyl alcohol _____ 60 grams (0.25 mole).
Butoxyethyl alcohol _____ 59 grams.
Paraformaldehyde _____ 16 grams.
Toluenesulfonic acid _____ 0.2 gram.

These materials and the mixture were heated to 88° C. until most of the paraformaldehyde was dissolved. Thereafter, 70 cc. of benzene was added and the mixture heated with refluxing over a water trap for 3 hours. The acid present in the benzene solution was then neutralized and the benzene distilled off, as previously described, leaving a yield of 118.5 grams of product equivalent to 95.9% of the calculated 123.5 gram yield. At a concentration of 400 milligrams of this product and 30 milligrams of pyrethrins in 100 cc. of odorless base oil, a knockdown of 91.5% and a kill of 87.4% were obtained as compared with an OTI knockdown of 94.2% and a kill of 54.5%.

*Example VI*

In this operation, n-butyraldehyde was substituted for the formaldehyde in the previous examples. The materials and proportions thereof were as follows:

Isosafrole thioethyl alcohol _____ 60 grams (0.25 mole).
Butoxyethoxyethyl alcohol _____ 81 grams.
n-Butyraldehyde _____ 27 grams.
Toluenesulfonic acid _____ 0.2 gram.

These materials were mixed and heated with refluxing over a water trap in 70 cc. of benzene, as previously described, for 15 hours. After neutralizing the acid present in the benzene solution and removing the benzene by reduced pressure distillation, a product weighing 158.5 grams was obtained, equivalent to 98% of the calculated 161.25 grams. At a concentration of 300 milligrams of the product and 30 milligrams of pyrethrins in 100 cc. of base oil, a knockdown of 73.3% and a kill of 60% were obtained, as compared with an OTI knockdown of 82% and a kill of 32.9%.

*Example VII*

In this operation, the following materials and proportions thereof were used:

Safrole thioethyl alcohol _____ 60 grams (0.25 mole).
Butoxyethoxyethyl alcohol _____ 81 grams (0.5 mole).
Paraformaldehyde _____ 15 grams.
Toluenesulfonic acid _____ 0.2 gram.

These materials were mixed and the mixture heated at 85° C. until most of the paraformaldehyde was dissolved and thereafter 70 cc. of benzene was added and the mixture heated with refluxing over a water trap for 2 hours. The acid present in the benzene solution was then neutralized as previously described and the benzene removed by reduced pressure distillation, giving a yield of 145 grams, as compared with a calculated 145.5 grams.

*Example VIII*

In this operation, the following materials and proportions thereof were used:

Piperonyl alcohol _____ 38 grams (0.25 mole).
Butoxyethoxyethyl alcohol _____ 81 grams (0.5 mole).
Paraformaldehyde _____ 16 grams.
Toluenesulfonic acid _____ 0.2 gram.

These materials were mixed and the mixture heated to 85° C. to dissolve most of the paraformaldehyde. Thereafter, 70 cc. of benzene was added and the mixture heated with refluxing over a water trap for 2½ hours. After neutralizing the acid and distilling off the benzene, as previously described, a yield of 123 grams of product was obtained as compared with a calculated yield of 123.5. At a concentration of 454 milligrams of this product and 30 milligrams of pyrethrins in 100 cc. of the base oil, a knockdown of 93.6% and a kill of 88.8% were obtained, as compared with an OTI knockdown of 94.2% and a kill of 54.3%.

When similarly tested, a concentration of 500 milligrams of this product and 50 milligrams of allethrin gave a knockdown of 88% and a kill of 65%.

*Example IX*

In this operation, the following materials and proportions thereof were used:

Piperonyl alcohol _____ 19 grams (0.125 mole).
Ethoxyethoxyethyl alcohol ____ 33.5 grams (0.25 mole).
Paraformaldehyde _____ 8 grams.
Toluenesulfonic acid _____ 0.2 gram.

After heating the mixture to 85° C. to dissolve most of the paraformaldehyde, 50 cc. of benzene was added and the mixture refluxed over a water trap for one hour. After washing the benzene solution free from acid and removing benzene by reduced pressure distillation, a yield of 54 grams was obtained as compared with the calculated yield of 54.75 grams.

At a concentration of 300 milligrams of this product and 30 milligrams of pyrethrins in 100 cc. of the base oil, a knockdown of 81.2% and a kill of 61.2% were obtained, as compared with an OTI knockdown of 84.8% and a kill of 31.3%.

*Example X*

In this operation, the following materials and proportions thereof were used:

Piperonyl alcohol_____ 19 grams (0.125 mole).
Butoxyethyl alcohol_____ 29.5 grams (0.25 mole).
Paraformaldehyde_____ 8 grams.
Toluenesulfonic acid_____ 0.2 gram.

After heating the mixture to 85° C. to dissolve most of the formaldehyde, 50 cc. of benzene was added and the mixture heated with refluxing over a water trap for 1⅓ hours. The benzene solution was then washed free of acid and the benzene distilled therefrom at reduced pressure, yielding 51 grams of product, as compared with the calculated yield of 50.75 grams.

At a concentration of 300 milligrams of this product and 300 milligrams of pyrethrins in 100 cc. of the odorless base oil, a knockdown of 87.5% and a kill of 77.5% were obtained, as compared with the OTI knockdown of 84.8% and a kill of 31.3%.

It will be understood that the OTI, i.e., Official Test Insecticide, referred to herein, was composed of 100 milligrams of pyrethrins dissolved in 100 cc. of an odorless base oil of the type conventionally used as the vehicle in such insecticidal compositions.

I claim:

1. A compound of the formula $R'—O—CH_2—O—R''$ in which $R'$ is a radical selected from the group consisting of piperonyl, safrole thioethyl and isosafrole thioethyl and $R''$ is a monovalent radical $—[(CH_2)_m—O]_n—R$ in which R is alkyl of from 1 to 4 carbon atoms, $m$ is an integer from 2 to 3 and $n$ is an integer from 1 to 2, said compound being stabilized against disproportionation by the presence therein of a minor proportion of the symmetrical formal $R''—O—CH_2—O—R''$.

2. The compound of claim 1 in which the radical $R'$ is piperonyl and the radical $R''$ is butoxyethoxyethyl.

3. The compound of claim 1 in which the radical $R'$ is safrole thioethyl and the radical $R''$ is butoxyethoxyethyl.

4. The compound of claim 1 in which the radical $R'$ is isosafrole thioethyl and the radical $R''$ is ethoxyethoxyethyl.

5. The compound of claim 1 in which the radical $R'$ is isosafrole thioethyl and the radical $R''$ is butoxyethoxyethyl.

6. The compound of claim 1 in which the radical $R'$ is isosafrole thioethyl and the radical $R''$ is methoxyethoxyethyl.

7. Method for producing the compounds of claim 1 which comprises heating a mixture of an alcohol selected from the group consisting of piperonyl alcohol, safrole thioethyl alcohol and isosafrole thioethyl alcohol and an alcohol of the formula $HO—[(CH_2)_m—O]_n—R$, in which R is alkyl of from 1 to 4 carbon atoms, $m$ is an integer from 2 to 3 and $n$ is an integer from 1 to 2, and formaldehyde in the presence of a strong nonvolatile acid catalyst selected from the group consisting of toluenesulfonic acid, naphthalenesulfonic acid and benzenesulfonic acid, the molar proportions of the second said alcohol and of the formaldehyde present in the mixture being substantially in excess of the molar proportion of the first said alcohol, while distilling from the mixture water formed by the reaction, until the reaction has been substantially completed as indicated by cessation of the evolution of water, and washing the resultant mixture free from acid.

8. The process of claim 7 in which the excess of formaldehyde is equivalent to the excess of the second said alcohol.

9. The process of claim 8 in which 2 moles of the second said alcohol is used per mole of the first said alcohol.

References Cited in the file of this patent

UNITED STATES PATENTS

| | | |
|---|---|---|
| 2,431,844 | Synerholm | Dec. 2, 1947 |
| 2,485,681 | Wachs | Oct. 25, 1949 |
| 2,494,458 | Synerholm | Jan. 10, 1950 |
| 2,521,366 | Hedenburg | Sept. 5, 1950 |
| 2,550,737 | Wachs | May 1, 1951 |
| 2,764,517 | Beroza | Sept. 25, 1956 |
| 2,832,792 | Beroza | Apr. 29, 1958 |

OTHER REFERENCES

Prill et al.: "Contributions from Boyce Thompson Institute," volume 14, pages 134 and 137 (1946).

Beroza: J. of Agr. and Food Chemistry, volume 4, pages 49–53 (1956).

Alexander et al.: J. Org. Chem., volume 23, pages 1969–1970 (1958).

Moore et al.: J. of the Science of Food and Agr., volume 9, pages 666–672 (1958).

Sweeney: Chem. Abs., volume 52, page 643e, 1958.

The Merck Index, 7th edition, 1960, pub. by Merck and Company, Inc., Rahway, New Jersey, pages 581 and 915.

UNITED STATES PATENT OFFICE
CERTIFICATE OF CORRECTION

Patent No. 3,077,480                              February 12, 1963

Oscar F. Hedenburg

It is hereby certified that error appears in the above numbered patent requiring correction and that the said Letters Patent should read as corrected below.

Column 2, lines 65 to 71, formula I, at the end of the formula, for "-$CH^3$" read -- -$CH_3$ --; column 3, lines 12 to 14, formula III, at the end of the formula, for "-CH" read -- -$CH_3$ --; column 7, line 25, for "300 milligrams" read -- 30 milligrams --.

Signed and sealed this 24th day of September 1963.

(SEAL)
Attest:

ERNEST W. SWIDER                              DAVID L. LADD
Attesting Officer                                   Commissioner of Patents